United States Patent
Yamauchi

(10) Patent No.: US 11,451,755 B2
(45) Date of Patent: Sep. 20, 2022

(54) METHOD FOR CONTROLLING ELECTRONIC INSTRUMENT AND ELECTRONIC INSTRUMENT

(71) Applicant: SEIKO EPSON CORPORATION, Tokyo (JP)

(72) Inventor: Taisuke Yamauchi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/185,267

(22) Filed: Feb. 25, 2021

(65) Prior Publication Data

US 2021/0266505 A1 Aug. 26, 2021

(30) Foreign Application Priority Data

Feb. 26, 2020 (JP) .............................. JP2020-030461

(51) Int. Cl.
*H04N 9/31* (2006.01)
*G06T 7/70* (2017.01)

(52) U.S. Cl.
CPC .............. *H04N 9/317* (2013.01); *G06T 7/70* (2017.01); *H04N 9/3191* (2013.01)

(58) Field of Classification Search
CPC .... H04N 9/317; H04N 9/3191; H04N 9/3179; H04N 9/3194; G06T 7/70; G01B 11/2504; G01B 11/2527; G01B 11/2536
USPC ....................................................... 348/745
See application file for complete search history.

(56) References Cited

U.S. PATENT DOCUMENTS

| 2009/0097039 | A1 | 4/2009 | Kawasaki et al. |
| 2009/0195557 | A1 | 8/2009 | Nakamura |
| 2013/0235092 | A1* | 9/2013 | Nakashin ................. G09G 5/10 353/121 |
| 2015/0130717 | A1* | 5/2015 | Hasu ...................... G06F 3/0386 345/158 |
| 2017/0078630 | A1* | 3/2017 | Wang ................... H04N 9/3185 |
| 2017/0294009 | A1* | 10/2017 | Pollard ..................... G06T 7/80 |
| 2019/0052851 | A1* | 2/2019 | Korl ....................... H04N 5/247 |

(Continued)

FOREIGN PATENT DOCUMENTS

| JP | 2009-115612 A | 5/2009 |
| JP | 2009-186288 A | 8/2009 |

(Continued)

*Primary Examiner* — Michael Lee
(74) *Attorney, Agent, or Firm* — Oliff PLC

(57) ABSTRACT

A method for controlling an electronic instrument including a projection section that projects an image via a projection lens and an imaging section that performs imaging via an imaging lens includes causing a first storage to store first characteristic data representing the characteristics of the projection lens, second characteristic data representing the characteristics of the imaging lens, and arrangement data representing the arrangement of the projection lens and the imaging lens and then causing the projection section to project a pattern image on an object via the projection lens, causing the imaging section to capture an image of the pattern image on the object via the imaging lens to generate captured image data, and updating the arrangement data based on the captured image data, the first characteristic data, and the second characteristic data without updating the first characteristic data and the second characteristic data.

8 Claims, 7 Drawing Sheets

(56) References Cited

U.S. PATENT DOCUMENTS

2019/0149788 A1\* 5/2019 Liou .................. G01B 11/2504
                                                          348/189
2020/0021727 A1\* 1/2020 Ikeda .................... G06T 3/0062

FOREIGN PATENT DOCUMENTS

JP      2010-197198 A    9/2010
WO      2006/120759 A1  11/2006

\* cited by examiner

METHOD FOR CONTROLLING ELECTRONIC INSTRUMENT AND ELECTRONIC INSTRUMENT

The present application is based on, and claims priority from JP Application Serial Number 2020-030461, filed Feb. 26, 2020, the disclosure of which is hereby incorporated by reference herein in its entirety.

BACKGROUND

1. Technical Field

The present disclosure relates to a method for controlling an electronic instrument and the electronic instrument.

2. Related Art

WO 2006/120759 discloses a three-dimensional measurement apparatus that measures the three-dimensional shape of an object by using a pattern projection method. The three-dimensional measurement apparatus projects a pattern image on an object via a projection lens. The three-dimensional measurement apparatus captures an image of the pattern image on the object via an imaging lens to generate captured image data. The three-dimensional measurement apparatus uses the captured image data, internal parameters of the projection lens, internal parameters of the imaging lens, and external parameters representing the arrangement of the projection lens and the imaging lens to measure the three-dimensional shape of the object. The internal parameters of the projection lens represent the characteristics of the projection lens, for example, the focal length of the projection lens and the lens distortion of the projection lens. The internal parameters of the imaging lens represent the characteristics of the imaging lens, for example, the focal length of the imaging lens and the lens distortion of the imaging lens.

In the three-dimensional measurement apparatus described in WO 2006/120759, for example, when the shapes of members that directly or indirectly support the projection lens and the imaging lens change with time, the reliability of the internal parameters of the projection lens or the reliability of the internal parameters of the imaging lens does not decrease, but the reliability of the external parameters may undesirably decrease. It is therefore desired to develop a technology capable of suppressing a situation in which a low-reliability external parameter keeps existing.

SUMMARY

A method for controlling an electronic instrument according to an aspect of the present disclosure is a method for controlling an electronic instrument including a projection section that projects an image via a projection lens and an imaging section that performs imaging via an imaging lens, the method includes causing a first storage to store first characteristic data representing characteristics of the projection lens, second characteristic data representing characteristics of the imaging lens, and arrangement data representing arrangement of the projection lens and the imaging lens and then causing the projection section to project a pattern image on an object via the projection lens, causing the imaging section to capture an image of the pattern image on the object via the imaging lens to generate captured image data, and updating the arrangement data stored by the first storage based on the captured image data, the first characteristic data stored by the first storage, and the second characteristic data stored by the first storage without updating the first characteristic data stored by the first storage and the second characteristic data stored by the first storage.

An electronic instrument according to another aspect of the present disclosure includes a projection section that projects a pattern image on an object via a projection lens after a first storage stores first characteristic data representing characteristics of the projection lens, second characteristic data representing characteristics of an imaging lens, and arrangement data representing arrangement of the projection lens and the imaging lens, an imaging section that captures an image of the pattern image on the object via the imaging lens to generate captured image data, and an update section that does not update the first characteristic data stored by the first storage and the second characteristic data stored by the first storage but updates the arrangement data stored by the first storage based on the captured image data, the first characteristic data stored by the first storage, and the second characteristic data stored by the first storage.

DESCRIPTION OF EXEMPLARY EMBODIMENTS

A: First Embodiment

A1: Overview of Electronic Instrument 100

Figure 1:
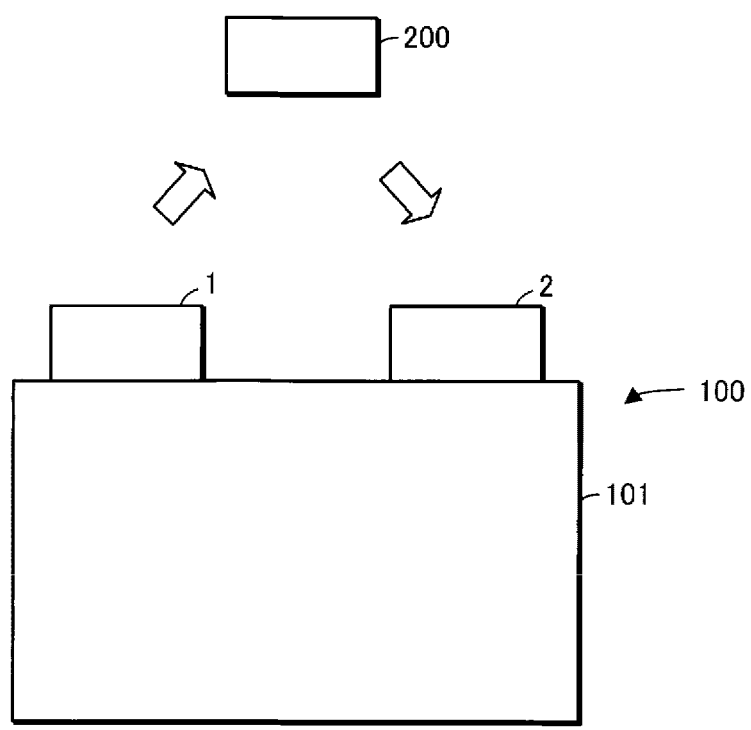
FIG. 1 is a diagrammatic view showing an electronic instrument according to a first embodiment.

FIG. 1 is a diagrammatic view showing an electronic instrument 100 according to a first embodiment. The electronic instrument 100 is, for example, a projector. The electronic instrument 100 is not limited to a projector and may, for example, be a measurement apparatus that measures the three-dimensional shape of an object. The electronic instrument 100 includes a projection apparatus 1, a camera 2, and an enclosure 101. The projection apparatus 1 and the camera 2 are disposed in the enclosure 101.

The electronic instrument 100 projects a gray code pattern used in a space coding method on an object 200 from the projection apparatus 1. The electronic instrument 100 causes the camera 2 to capture an image of the gray code pattern on the object 200 to generate captured image data. The electronic instrument 100 measures the three-dimensional shape of the object 200 based on the captured image data. When the electronic instrument 100 is a projector, the object 200 is a projection receiving object on which an image is projected from the electronic instrument 100, for example, a screen, a whiteboard, a wall, a door, and a product.

Figure 2:
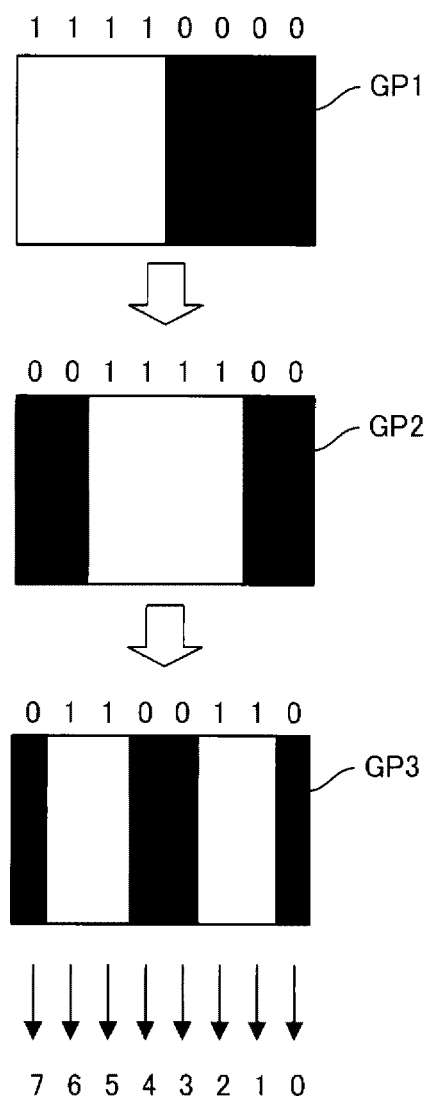
FIG. 2 shows an example of gray code patterns GP1 to GP3.

FIG. 2 shows an example of gray code patterns GP1 to GP3. The gray code patterns GP1 to GP3 are each a pattern having a black portion representing "0" and a white portion representing "1".

The electronic instrument 100 associates a first specific position in the projected gray code patterns GP1 to GP3 and a second specific position corresponding to the first specific position in a captured image indicated by the captured image data with each other. For example, the electronic instrument 100 associates the first specific position indicated by "010"="3" in the projected gray code patterns GP1 to GP3 and the second specific position indicated by "010"="3" in the captured image with each other. The electronic instrument 100 measures the three-dimensional shape of the object 200 based on the positional relationship between the first specific position and the second specific position.

The number of gray code patterns is not limited to three. In addition to the gray code patterns GP1 to GP3, which are formed of vertical stripes, gray code patterns formed of horizontal stripes may be used. The electronic instrument 100 may measure the three-dimensional shape of the object 200 by using patterns different from the gray code patterns GP1 to GP3. For example, the electronic instrument 100 may measure the three-dimensional shape of the object 200 by using a pattern used in a phase shift method.

A2: Example of Electronic Instrument 100

Figure 3:
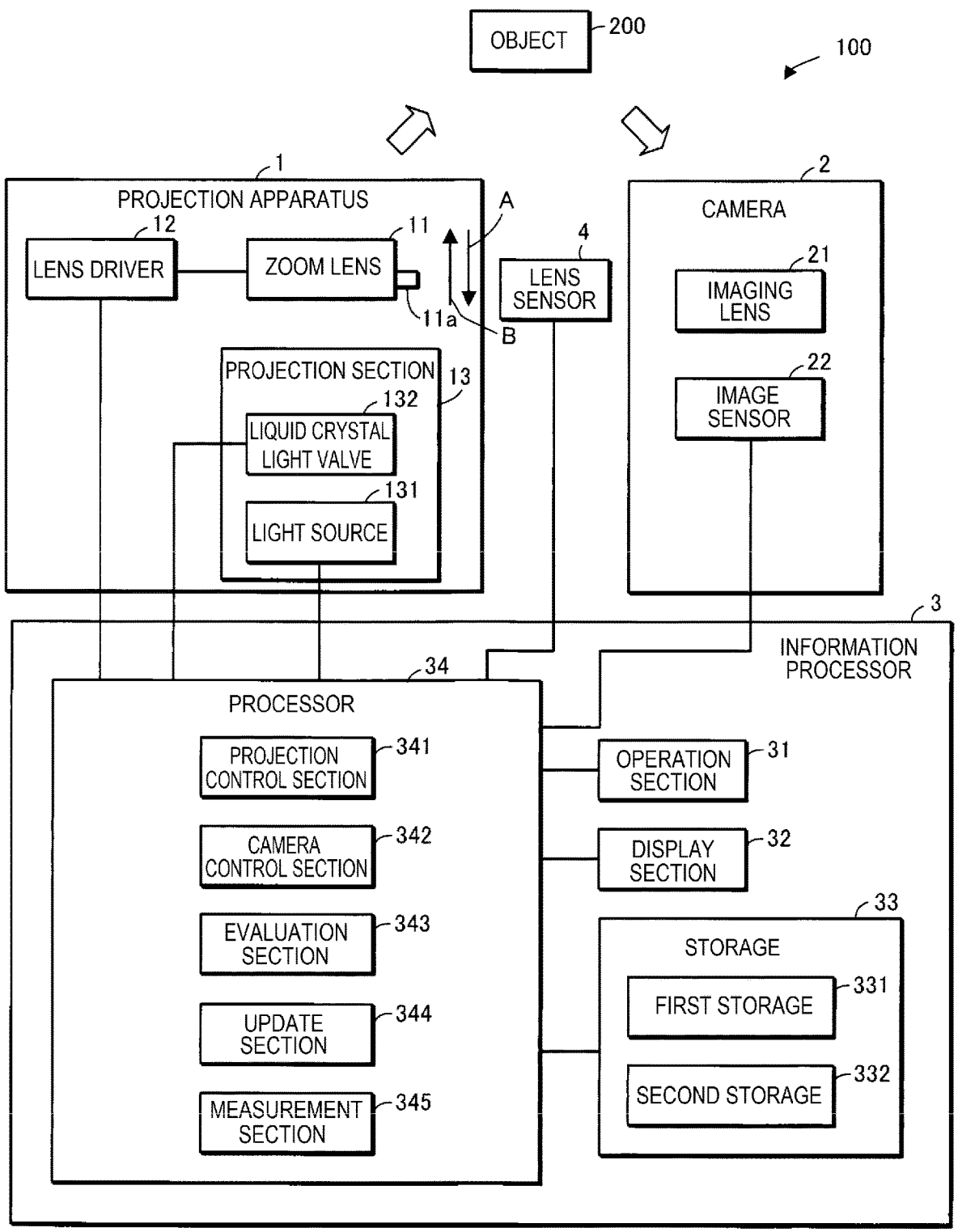
FIG. 3 shows an example of the electronic instrument.

FIG. 3 shows an example of the electronic instrument 100. The electronic instrument 100 includes the projection apparatus 1, the camera 2, an information processor 3, and a lens sensor 4.

A3: Projection Instrument 1

The projection instrument 1 includes a zoom lens 11, a detected element 11a, a lens driver 12, and a projection section 13.

The zoom lens 11 is an example of a projection lens. The focal length of the zoom lens 11 can be changed over a range from the first focal length f1 to a second focal length f2. The first focal length f1 is greater than the second focal length f2. The situation in which the focal length of the zoom lens 11 is the first focal length f1 means that the focal point of the zoom lens 11 is the "telescopic end." The situation in which the focal length of the zoom lens 11 is the second focal length f2 means that the focal point of the zoom lens 11 is the "wide angle end."

The position of the principal point of the zoom lens 11 is determined in accordance with the focal length of the zoom lens 11. As the focal length of the zoom lens 11 decreases, the position of the principal point of the zoom lens 11 moves in a first arrow direction A. As the focal length of the zoom lens 11 increases, the position of the principal point of the zoom lens 11 moves in a second arrow direction B. The second arrow direction B is opposite the first arrow direction A.

The position of the principal point of the zoom lens 11 when the focal point of the zoom lens 11 is the "telescopic end" is an example of a predetermined position N1. The predetermined position N1 is not limited to the position of the principal point of the zoom lens 11 when the focal point of the zoom lens 11 is the "telescopic end." For example, the predetermined position N1 may instead be the position of the principal point of the zoom lens 11 when the focal point of the zoom lens 11 is the "wide angle end." Still instead, the predetermined position N1 may be a position between the position of the principal point of the zoom lens 11 when the focal point of the zoom lens 11 is the "telescopic end" and the position of the principal point of the zoom lens 11 when the focal point of the zoom lens 11 is the "wide angle end." The function of changing the focal length of the zoom lens 11 is referred to as a "zoom function."

The detected element 11a moves in accordance with the change in the focal length of the zoom lens 11. The detected element 11a is, for example, a protrusion.

The lens sensor 4 detects whether or not the principal point of the zoom lens 11 is located in the predetermined position N1. The lens sensor 4 is, for example, a switch that is turned on when the lens sensor 4 comes into contact with the detected element 11a when the principal point of the zoom lens 11 is located in the predetermined position N1. The lens sensor 4 is not limited to the switch described above. For example, the lens sensor 4 may be a contactless detector that detects the detected element 11a in a contactless manner when the principal point of the zoom lens 11 is located in the predetermined position N1. The contactless detector is, for example, an optical sensor that detects light reflected off the detected element 11a when the principal point of the zoom lens 11 is located in the predetermined position N1.

The lens driver 12 is, for example, a motor. The lens driver 12 changes the focal length of the zoom lens 11. The focal length of the zoom lens 11 may be manually changed. In this case, the lens driver 12 may be omitted.

The projection section 13 projects a projection image on the object 200 via the zoom lens 11. For example, when the electronic instrument 100 measures the three-dimensional shape of the object 200, the projection section 13 projects as a projection image the gray code patterns GP1 to GP3 shown in FIG. 2 by way of example. The projection section 13 includes a light source 131 and a liquid crystal light valve 132.

The light source 131 is an LED (light emitting diode). The light source 131 is not limited to an LED and may, for example, be a xenon lamp, an ultrahigh-pressure mercury lamp, or a laser light source.

Figure 4:
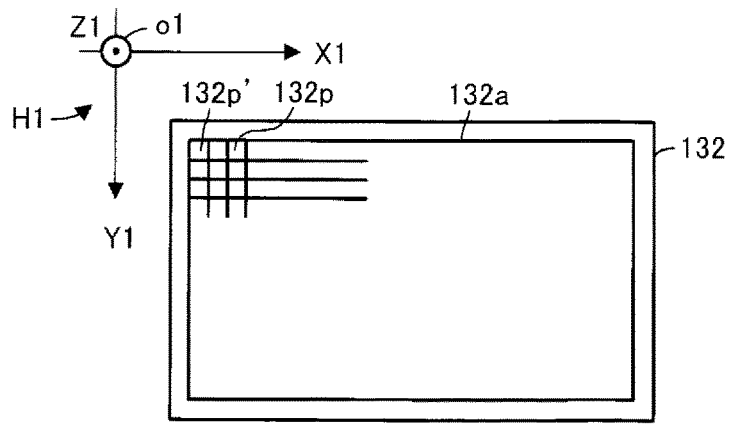
FIG. 4 shows an example of a liquid crystal light valve.

The liquid crystal light valve 132 is formed, for example, of a liquid crystal panel including a liquid crystal material sandwiched between a pair of transparent substrates. The liquid crystal light valve 132 has a rectangular pixel area 132a, as shown in FIG. 4. The pixel area 132a includes a plurality of pixels 132p arranged in a matrix.

A three-dimensional first coordinate system H1 is applied to the liquid crystal light valve 132. The first coordinate system H1 is the coordinate system of the projection apparatus 1. An origin o1 of the first coordinate system H1 is set in the position of the principal point of the zoom lens 11. The first coordinate system H1 is specified by axes X1, Y1, and Z1.

The orientation of the axis X1, the orientation of the axis Y1, and the orientation of the axis Z1 are each determined in accordance with the orientation of the liquid crystal light valve 132. The direction of the axis X1 is the horizontal direction of the liquid crystal light valve 132, further, the lateral direction of the liquid crystal light valve 132. The direction of the axis Y1 is perpendicular to the direction of the axis X1. The direction of the axis Y1 is the vertical direction of the liquid crystal light valve 132, further, the longitudinal direction of the liquid crystal light valve 132. The direction of the axis Z1 is perpendicular to the direction of the axis X1 and the direction of the axis Y1.

The distance from the liquid crystal light valve 132 to the principal point of the zoom lens 11 in the axis-Z1 direction changes in accordance with the focal length of the zoom lens 11.

In the liquid crystal light valve 132, drive voltage according to image data is applied to the liquid crystal material for each of the pixels 132p. The optical transmission at each of the pixels 132p is set by the drive voltage. The light outputted from the light source 131 is modulated by the pixel area 132a. The light modulated by the liquid crystal light valve 132 travels toward the zoom lens 11. The liquid crystal light valve 132 is an example of a light modulator. The zoom lens 11 projects a projection image that is the light modulated by the liquid crystal light valve 132 on the object 200.

A4: Camera 2

The camera 2 captures an image of the projection image on the object 200 to generate captured image data. The camera 2 includes an imaging lens 21 and an image sensor 22.

The imaging lens 21 brings an optical image of the projection image on the object 200 into focus on the image sensor 22. The imaging lens 21 has no zooming function.

Figure 5:
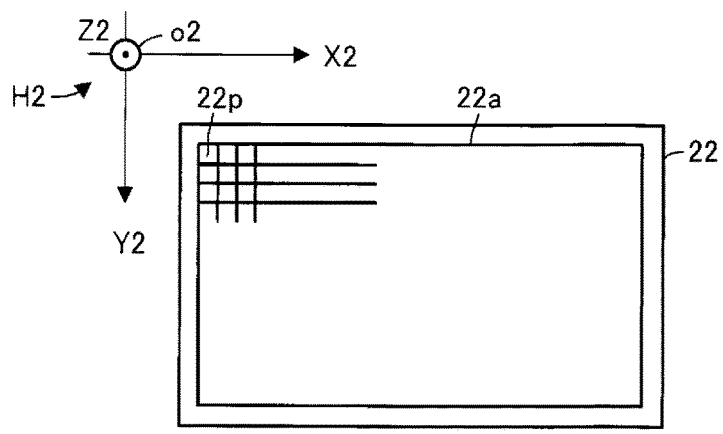
FIG. 5 shows an example of an image sensor.

The image sensor 22 is, for example, a CCD (charge coupled device) image sensor. The image sensor 22 is not limited to a CCD image sensor and may instead, for example, be a CMOS (complementary metal oxide semiconductor) image sensor. The image sensor 22 generates captured image data based on the optical image of the projection image brought into focus by the imaging lens 21. The image sensor 22 has a rectangular imaging area 22a, as shown in FIG. 5 by way of example. The imaging area 22a includes a plurality of light receiving cells 22p arranged in a matrix. The image sensor 22 is an example of an imaging section.

A three-dimensional second coordinate system H2 is applied to the image sensor 22. The second coordinate system H2 is the coordinate system of the camera 2. An origin o2 of the second coordinate system H2 is set in the position of the principal point of the imaging lens 21. The second coordinate system H2 is specified by axes X2, Y2, and Z2.

The orientation of the axis X2, the orientation of the axis Y2, and the orientation of the axis Z2 are each determined in accordance with the orientation of the image sensor 22. The direction of the axis X2 is the horizontal direction of the image sensor 22, further, the lateral direction of the image sensor 22. The direction of the axis Y2 is perpendicular to the direction of the axis X2. The direction of the axis Y2 is the vertical direction of the image sensor 22, further, the longitudinal direction of the image sensor 22. The direction of the axis Z2 is perpendicular to the direction of the axis X2 and the direction of the axis Y2.

The distance from the image sensor 22 to the principal point of the imaging lens 21 in the axis-Z2 direction is equal to the focal length of the imaging lens 21.

A5: Information Processor 3

The information processor 3 performs a variety of types of processing. For example, the information processor 3 measures the three-dimensional shape of the object 200 based on the captured image data.

The information processor 3 includes an operation section 31, a display section 32, a storage 33, and a processor 34.

The operation section 31 is, for example, a keyboard, a mouse, operation buttons, operation keys, or a touch panel. The operation section 31 receives a user's input operation.

The display section 32 is a display, for example, a liquid crystal display, a plasma display, an organic EL (electro luminescence) display, or any other FPD (flat panel display). The display section 32 displays a variety of pieces of information.

The storage 33 is a recording medium readable by the processor 34. The storage 33 includes, for example, a nonvolatile memory and a volatile memory. The nonvolatile memory is, for example, a ROM (read only memory), an EPROM (erasable programmable read only memory), and an EEPROM (electrically erasable programmable read only memory). The volatile memory is, for example, a RAM (random access memory). The storage 33 includes a first storage 331 and a second storage 332.

The first storage 331 stores internal parameters of the zoom lens 11, internal parameters of the imaging lens 21, external parameters, the position of the actual image sensor 22, and the position of the actual liquid crystal light valve 132.

The internal parameters of the zoom lens 11 represent the characteristics of the zoom lens 11. The internal parameters of the zoom lens 11 include, as the characteristics of the zoom lens 11, the focal length of the zoom lens 11, the lens distortion of the zoom lens 11, a center offset that occurs when the zoom lens 11 is attached, and an optical axis angle shift that occurs when the zoom lens 11 is attached. The center offset that occurs when the zoom lens 11 is attached represents the amount of shift between the actual center position of the zoom lens 11 and reference coordinates in the plane of the liquid crystal light valve 132, for example, the coordinates of an upper left pixel 132p'. The optical axis angle shift that occurs when the zoom lens 11 is attached represents the angular shift between the actual optical axis of the zoom lens 11 and the axis z of the liquid crystal light valve 132. The internal parameters of the zoom lens 11 are an example of first characteristics data.

The manufacture of the electronic instrument 100 causes the first storage 331 to store the internal parameters of the zoom lens 11 before the electronic instrument 100 is shipped. For example, the manufacturer of the electronic instrument 100 causes the first storage 331 to store as the internal parameters of the zoom lens 11 parameters representing the characteristics of the zoom lens 11 when the principal point of the zoom lens 11 is located in the predetermined position N1. A person who is not the manufacturer of the electronic instrument 100, for example, an inspector of the electronic instrument 100 may cause the first storage 331 to store the internal parameters of the zoom lens 11.

The internal parameters of the imaging lens 21 represent the characteristics of the imaging lens 21. The internal parameters of the imaging lens 21 include, as the characteristics of the imaging lens 21, the focal length of the imaging lens 21, the lens distortion of the imaging lens 21, a center offset that occurs when the imaging lens 21 is attached, and an optical axis angle shift that occurs when the imaging lens 21 is attached. The internal parameters of the imaging lens 21 are an example of second characteristic data representing the characteristics of the imaging lens 21.

The manufacture of the electronic instrument 100 causes the first storage 331 to store the internal parameters of the imaging lens 21 before the electronic instrument 100 is shipped. A person who is not the manufacturer of the electronic instrument 100, for example, an inspector of the electronic instrument 100 may cause the first storage 331 to store the internal parameters of the imaging lens 21.

The external parameters represent the arrangement of the zoom lens 11 and the imaging lens 21. The external parameters include a rotation matrix R1 and a translational matrix T1. The rotation matrix R1 is a matrix based on the angular shift between the first coordinate system H1 and the second coordinate system H2. Specifically, the rotation matrix R1 is a matrix for aligning the direction of the axis X2 with the direction of the axis X1, aligning the direction of the axis Y2 with the direction of the axis Y1, and aligning the direction of the axis Z2 with the direction of the axis Z1. The translational matrix T1 is a matrix based on the amount of positional shift between the position of the principal point of the zoom lens 11 and the position of the principal point of the imaging lens 21. The external parameters are an example of arrangement data.

The manufacture of the electronic instrument 100 causes the first storage 331 to store the external parameters before the electronic instrument 100 is shipped. For example, the manufacturer of the electronic instrument 100 causes the first storage 331 to store as the external parameters the rotation matrix R1 when the principal point of the zoom lens is located in the predetermined position N1 and the translational matrix T1 when the principal point of the zoom lens 11 is located in the predetermined position N1. A person who is not the manufacturer of the electronic instrument 100, for example, an inspector of the electronic instrument 100 may cause the first storage 331 to store the external parameters.

The first storage 331 may be a component separate from the electronic instrument 100. For example, the first storage 331 may be accommodated in a server communicable with the electronic instrument 100. In this case, the electronic instrument 100 transmits and receives data to and from the first storage 331 via a wired or wireless interface.

The first storage 331 is formed, for example, of a single recording medium. The first storage 331 may be formed of a first recording medium that stores the internal parameters of the zoom lens 11, a second recording medium that stores the internal parameters of the imaging lens 21, and a third recording medium that stores the external parameters. One of the first to third recording media may also serve as one of the other recording media.

The second storage 332 is formed of one recording medium or two or more recording media. The second storage 332 stores a program executed by the processor 34 and a variety of data used by the processor 34. The second storage 332 may serve as the first storage 331.

The processor 34 is formed, for example, of one processor or two or more processors. As an example, the processor 34 is formed of one CPU (central processing unit) or two or more CPUs. Part or entirety of the functions of the processor 34 may be achieved, for example, by a DSP (digital signal processor), an ASIC (application specific integrated circuit), a PLD (programmable logic device), or an FPGA (field programmable gate array). The processor 34 concurrently or successively perform a variety of types of processing.

The processor 34 reads the program from the storage 33. The processor 34 executes the program to achieve a projection control section 341, a camera control section 342, an evaluation section 343, an update section 344, and a measurement section 345.

The projection control section 341 controls the projection apparatus 1 to cause the projection apparatus 1 to project a projection image toward the object 200. The projection control section 341 may be formed of one projection controller or two or more projection controllers or any other circuit.

The camera control section 342 controls the camera 2 to cause the camera 2 to generate captured image data. The camera control section 342 may be formed of one camera controller or two or more camera controllers or any other circuit.

The evaluation section 343 evaluates based on the result of the detection performed by the lens sensor 4 whether or not the principal point of the zoom lens 11 is located in the predetermined position N1. The evaluation section 343 may be formed of an evaluation circuit or any other circuit.

The update section 344 does not update the internal parameters of the zoom lens 11 stored by the first storage 331 and the internal parameters of the imaging lens 21 stored by the first storage 331 but updates the external parameters stored by the first storage 331 based on the captured image data, the internal parameters of the zoom lens 11 stored by the first storage 331, and the internal parameters of the imaging lens 21 stored by the first storage 331.

For example, the update section 344 does not update the internal parameters of the zoom lens 11 stored by the first storage 331 and the internal parameters of the imaging lens 21 stored by the first storage 331 but updates the external parameters stored by the first storage 331 based on the captured image data generated in accordance with the evaluation result representing that the principal point of the zoom lens 11 is located in the predetermined position N1, the internal parameters of the zoom lens 11, and the internal parameters of the imaging lens 21. The update section 344 may be formed of an update circuit or any other circuit.

The measurement section 345 measures the three-dimensional shape of the object 200 based on the captured image data, the internal parameters of the zoom lens 11 stored by the first storage 331, the internal parameters of the imaging lens 21 stored by the first storage 331, and the external parameters stored by the first storage 331.

A6: An Example of Measurement of Three-Dimensional Shape

Figure 6:
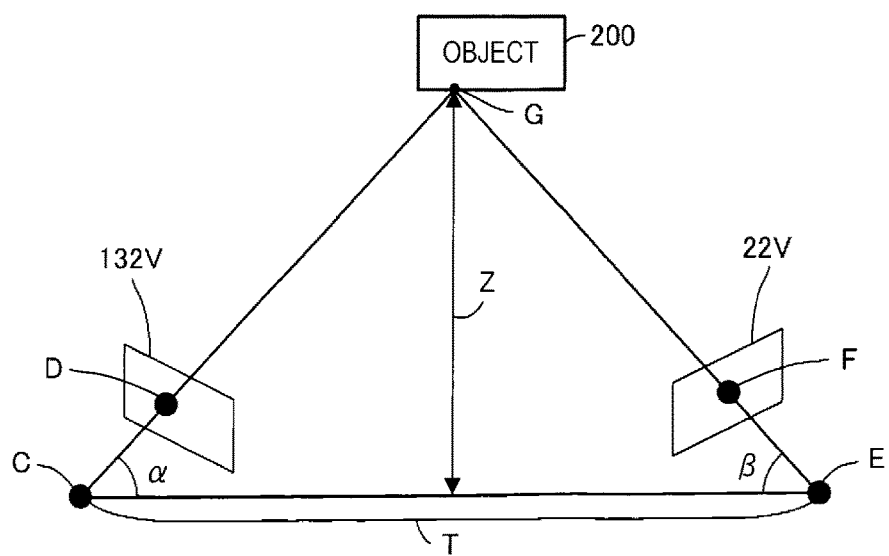
FIG. 6 describes an approach for measuring the three-dimensional shape of an object.

FIG. 6 describes an approach for measuring the three-dimensional shape of the object 200. A position C of the principal point of the zoom lens 11 changes in accordance with the focal length of the zoom lens 11. A first reference point D is the position where an image to be projected at a measurement point G on the object 200 is present. FIG. 6 shows an imaginary liquid crystal light valve 132V in place of the liquid crystal light valve 132. The imaginary liquid crystal light valve 132V is set in a position where the imaginary liquid crystal light valve 132V and the liquid crystal light valve 132 are symmetric with respect to the position C of the principal point of the zoom lens 11. FIG. 6 shows the imaginary liquid crystal light valve 132V because the imaginary liquid crystal light valve 132V is typically used in epipolar geometry used in three-dimensional measurement.

A position E of the principal point of the imaging lens 21 is fixed because the focal length of the imaging lens 21 is fixed. A second reference point F is the position where the image at the measurement point G is present in a captured image indicated by the captured image data. FIG. 6 shows an imaginary image sensor 22V in place of the image sensor 22. The imaginary image sensor 22V is set in a position where the imaginary image sensor 22V and the imaginary image sensor 22 are symmetric with respect to the position E of the principal point of the imaging lens 21. FIG. 6 shows the imaginary image sensor 22V because the imaginary image sensor 22V is typically used in the epipolar geometry.

FIG. 6 shows an angle α as the angle between a straight line CE and a straight line CG, an angle β as the angle between the straight line CE and a straight line EG, and a length T as the length of the straight line CE. A distance Z to the measurement point G on the object 200 can be expressed as follows.

$$Z = T((1/\tan \alpha) + (1/\tan \beta))$$

The measurement section 345 calculates the distance Z while changing the measurement point G to measure the three-dimensional shape of the object 200.

The position C of the principal point of the zoom lens 11, the first reference point D, the position of the liquid crystal light valve 132, and the position of the imaginary liquid crystal light valve 132V are each identified by the first coordinate system H1. The position E of the principal point of the imaging lens 21, the second reference point F, the position of the image second 22, and the position of the imaginary image second 22V are each identified by the second coordinate system H2.

Figure 7:
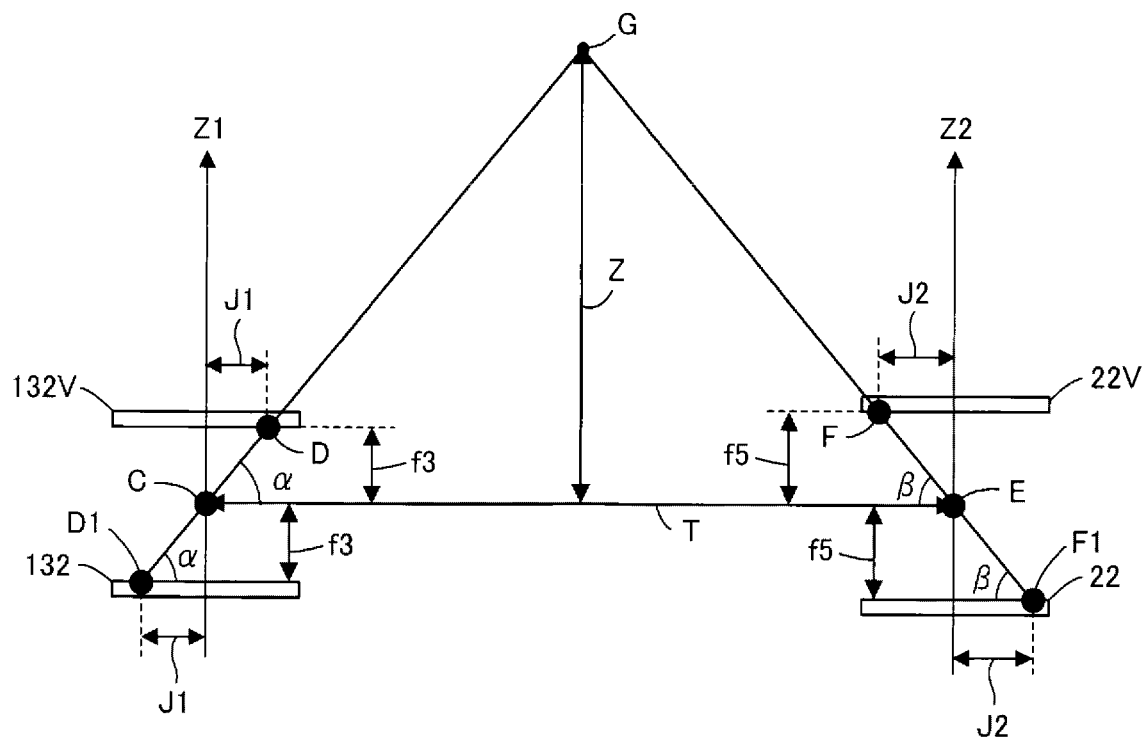
FIG. 7 describes the approach for measuring the three-dimensional shape of the object.

The measurement section 345 corrects the positional relationship among the position C of the principal point of the zoom lens 11, the first reference point D, the position E of the principal point of the imaging lens 21, the second reference point F, the measurement point G, the position of the actual liquid crystal light valve 132, the position of the imaginary liquid crystal light valve 132V, the position of the actual image sensor 22, and the position of the imaginary image sensor 22V to an imaginary positional relationship shown in FIG. 7 to readily calculate the distance Z.

In FIG. 7, tan α is expressed by a distance J1 determined based on the position of the first reference point D and a focal length f3 of the zoom lens 11. The first reference point D is the intersection of the imaginary liquid crystal light valve 132V and the straight line CG. In FIG. 7, tan is expressed by a distance J2 determined based on the position of the second reference point F and a focal length f5 of the imaging lens 21. The second reference point F is the intersection of the imaginary image sensor 22V and the straight line EG. In FIG. 7, a position corresponding to the first reference point D in the liquid crystal light valve 132 is shown as a third reference point D1, and a position corresponding to the second reference point F in the image sensor 22 is shown as a fourth reference point F1.

The third reference point D1 is set in the position where the third reference point D1 and the first reference point D are symmetric with respect to the position C of the principal point of the zoom lens 11. The third reference point D1 is a position in the liquid crystal light valve 132 that is the position where the image projected at the measurement point G is present. The first reference point D is a position in the imaginary liquid crystal light valve 132V that is the position where the image projected at the measurement point G is present.

The fourth reference point F1 is set in the position where the fourth reference point F1 and the second reference point F are symmetric with respect to the position E of the principal point of the imaging lens 21. The fourth reference point F1 is a position in the image sensor 22 that is the position where the image at the measurement point G is present. The second reference point F is a position in the imaginary image sensor 22V that is the position where the image at the measurement point G is present.

To set the imaginary positional relationship shown in FIG. 7, the measurement section 345 reads from the first storage 331 the internal parameters of the zoom lens 11, the internal parameters of the imaging lens 21, the external parameters, the position of the actual liquid crystal light valve 132, and the position of the actual image sensor 22.

The measurement section 345 uses the position of the actual liquid crystal light valve 132 and the focal length of the zoom lens 11 to identify the position C of the principal point of the zoom lens 11. As an example, the measurement section 345 identifies the position separate in the axis-Z1 direction from the center position set in the liquid crystal light valve 132 by the focal length of the zoom lens 11 as the position C of the principal point of the zoom lens 11.

Figure 8:
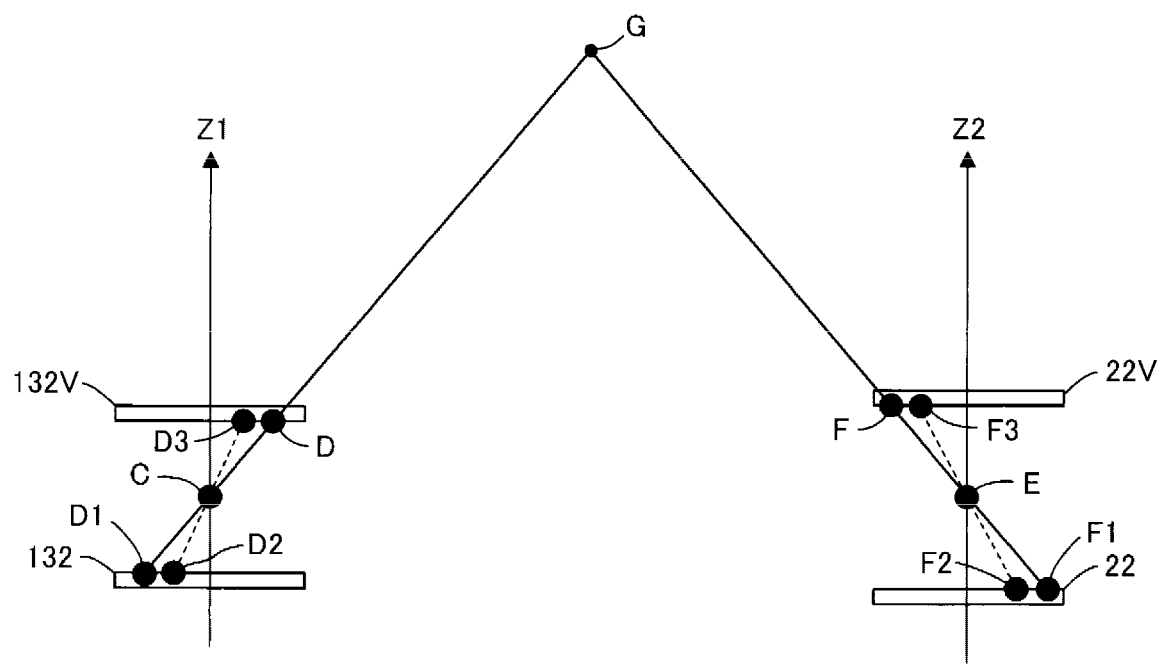
FIG. 8 shows the necessity for correction in triangulation.

In FIG. 7, the first reference point D and the third reference point D1 are located on the straight line passing through the position C of the principal point of the zoom lens 11 and the measurement point G. In the liquid crystal light valve 132, however, a first presence position D2, where the image projected at the measurement point G is actually present, is not located on the straight line passing through the position C of the principal point of the zoom lens 11 and the measurement point G due, for example, to the lens distortion of the zoom lens 11 and the optical axis angle shift that occurs when the zoom lens 11 is attached but is located at a location different from the third reference point D1, as shown in FIG. 8. Further, in the imaginary liquid crystal light valve 132V, a third presence position D3, which is so located that the third reference point D3 and the first presence position D2 are symmetric with respect to the position C of the principal point of the zoom lens 11, is not located on the straight line passing through the position C of the principal point of the zoom lens 11 and the measurement point G but is located at a location different from the first reference point D.

The measurement section 345 therefore corrects the first presence position D2 based on the focal length of the zoom lens 11, the center offset that occurs when the zoom lens 11 is attached, the optical axis angle shift that occurs when the zoom lens 11 is attached, and the lens distortion of the zoom lens 11 to identify the position of the third reference point D1 and the position of the first reference point D.

The measurement section 345 further identifies the position E of the principal point of the imaging lens 21 by using the position of the actual image sensor 22 and the focal length of the imaging lens 21. As an example, the measurement section 345 identifies the position separate in the axis-Z2 direction from the design center position in the image sensor 22 by the focal length of the imaging lens 21 as the position E of the principal point of the imaging lens 21.

In FIG. 7, the second reference point F and the fourth reference point F1 are located on the straight line passing through the position E of the principal point of the imaging lens 21 and the measurement point G. In the image sensor 22, however, a second presence position F2, where the image at the measurement point G is actually present, is not located on the straight line passing through the position E of the principal point of the imaging lens 21 and the measurement point G due, for example, to the lens distortion of the imaging lens 21 and the optical axis angle shift that occurs when the imaging lens 21 is attached but is located at a location different from the fourth reference point F1, as shown in FIG. 8. Further, in the imaginary image sensor 22V, a fourth presence position D3, which is so located that the fourth reference point D3 and the second presence position F2 are symmetric with respect to the position E of the principal point of the imaging lens 21, is also not located on the straight line passing through the position E of the principal point of the imaging lens 21 and the measurement point G but is located at a location different from the second reference point F.

The measurement section 345 therefore corrects the second presence position F2 based on the focal length of the imaging lens 21, the center offset that occurs when the imaging lens 21 is attached, the optical axis angle shift that occurs when the imaging lens 21 is attached, and the lens distortion of the imaging lens 21 to identify the position of the fourth reference point F1 and the position of the second reference point F.

The measurement section 345 converts the coordinates in the second coordinate system H2 into the coordinates in the first coordinate system H1 by using the rotation matrix R1 and the translational matrix T1. The measurement section 345 uses the coordinates in the first coordinate system H1 while changing the measurement point G to perform the computation of $Z=T((1/\tan \alpha)+(1/\tan \beta))$.

A7: Necessity of Updating External Parameters

Even when the shape of the enclosure 101 shown in FIG. 1 by way of example changes, further, even when the shapes of members that directly or indirectly support the zoom lens 11 and the imaging lens 21 change with time, the characteristics of the zoom lens 11 or the characteristics of the imaging lens 21 do not change. The reliability of the internal parameters of the zoom lens 11 stored by the first storage 331 and the reliability of the internal parameters of the imaging lens 21 stored by the first storage 331 therefore do not decrease. Therefore, even when the shapes of the members that directly or indirectly support the zoom lens 11 and the imaging lens 21 change with time, there is a low necessity of updating the internal parameters of the zoom lens 11 stored by the first storage 331 and the internal parameters of the imaging lens 21 stored by the first storage 331.

On the other hand, when the shapes of the members that directly or indirectly support the zoom lens 11 and the imaging lens 21 change with time, the arrangement of the zoom lens 11 and the imaging lens 21 can undesirably change. The reliability of the external parameters stored by the first storage 331 therefore decreases. Therefore, when the shapes of the members that directly or indirectly support the zoom lens 11 and the imaging lens 21 change with time, the external parameters stored by the first storage 331 need to be updated.

The update section 344 then do not update the internal parameters of the zoom lens 11 stored by the first storage 331 and the internal parameters of the imaging lens 21 stored by the first storage 331 but updates the external parameters stored by the first storage 331, specifically, the rotation matrix R1 stored by the first storage 331 and the translational matrix T1 stored by the first storage 331. For example, the update section 344 uses epipolar restriction to calculate new external parameters, specifically, a new rotation matrix R1 and a new translational matrix T1. The update section 344 replaces the external parameters stored by the first storage 331 with the new external parameters to update the external parameters stored by the first storage 331.

A8: Approach for Updating External Parameters

Figure 9:
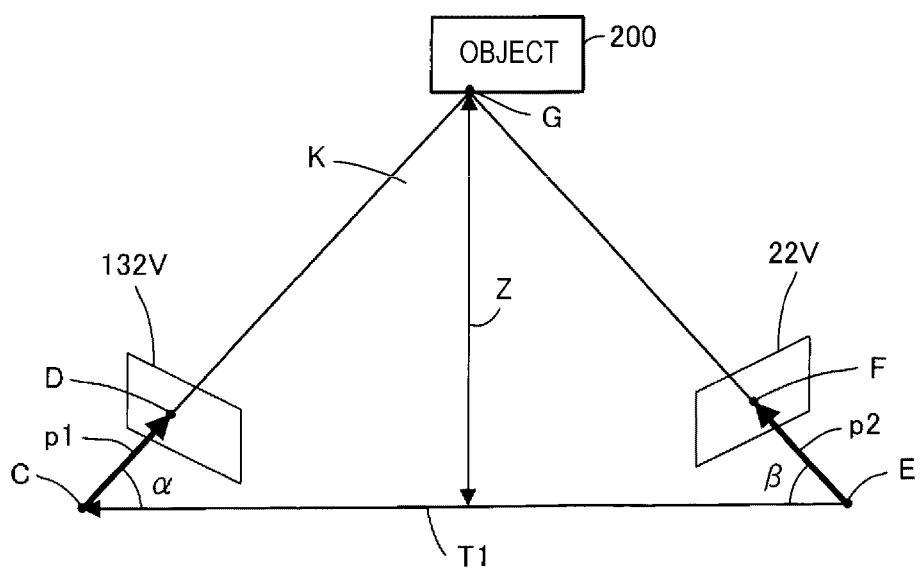
FIG. 9 describes epipolar restriction.

The first reference point D and the second reference point F are present in an epipolar plane K, which passes through the measurement point G, the position C of the principal point of the zoom lens 11, and the position E of the principal point of the imaging lens 21, as shown in FIG. 9 by way of example.

In FIG. 9, a first vector p1 is a vector that starts from the position C of the principal point of the zoom lens 11 and ends at the first reference point D. A second vector p2 is a vector that starts from the position E of the principal point of the imaging lens 21 and ends at the second reference point F. The first vector p1 is generated by rotating the vector that starts from the position C of the principal point of the zoom lens 11 and ends at the third reference point D1 by 180° around the position C of the principal point of the zoom lens 11 as the center of rotation. The second vector p2 is generated by rotating the vector that starts from the position E of the principal point of the imaging lens 21 and ends at the fourth reference point F1 by 180° around the position E of the principal point of the imaging lens 21 as the center of rotation.

The first vector p1, the second vector p2, the rotation matrix R1, and the translational matrix T1 satisfy Expressions 1, 2, and 3. The translational matrix T1 is also a vector.

$$p2 = R1p1 + T1 \qquad \text{Expression 1}$$

$$T1 \times p2 = T1 \times R1p1 \qquad \text{Expression 2}$$

$$p1 \cdot (T1 \times p2) = p2 \cdot (T1 \times p1) = 0 \qquad \text{Expression 3}$$

The epipolar restriction is restriction based on the relationship shown in FIG. 9, specifically, restriction based on Expressions 1 to 3. The vector product of the two vectors present in the epipolar plane K represents a vector perpendicular to the epipolar plane K. The scalar product of the vector product of the two vectors present in the epipolar plane K and another vector present in the epipolar plane K is therefore "zero." Expression 3 is specified based on the relationship described above. The update section 344 uses the internal parameters of the zoom lens 11 stored by the first storage 331, the internal parameters of the imaging lens 21 stored by the first storage 331, the captured image data, and Expression 3 to calculate the rotation matrix R1 and the translational matrix T1, that is, the external parameters.

The rotation matrix R1 is defined by three rotational operations in total, rotation around the axis X1, rotation around the axis Y1, and rotation around the axis Z1. That is, the number of variables in the rotation matrix R1 is "3".

The translational matrix T1 is defined by three translational operations in total, translation in the axis X1, translation in the axis Y1, and translation in the axis Z1. That is, the number of variables in the translational matrix T1 is "3". Expression 3 used to calculate the external parameters is, however, formed of the vector product calculation and the scalar product calculation. Therefore, in Expression 3, the direction of each of the vectors is required, but the magnitude of each of the vectors is not required. The epipolar restriction is therefore achieved, for example, with vectors normalized by two variables, such as (x, y, 1). That is, the number of variables in the translational matrix T1 can be substantially reduced to "2".

The number of variables of the external parameters formed of the rotation matrix R1 and the translational matrix T1 is therefore "5", which is the result of addition of "3", which is the number of variables in the rotation matrix R1, to "2", which is the number of variables in the translational matrix T1. The update section 344 can therefore calculate the rotation matrix R1 and the translational matrix T1, that is, the external parameters as long as there are five measurement points G independent of one another.

As for the translational matrix T1 calculated based on five measurement points G, the direction of each of the vectors is calculated, but the magnitude of each of the vectors is not calculated. Therefore, when the magnitude of each of the vectors in the translational matrix T1 is required, the magnitude of each of the vectors calculated, for example, from the translational matrix T1 before the update may be used.

A9: Description of Action

Figure 10:
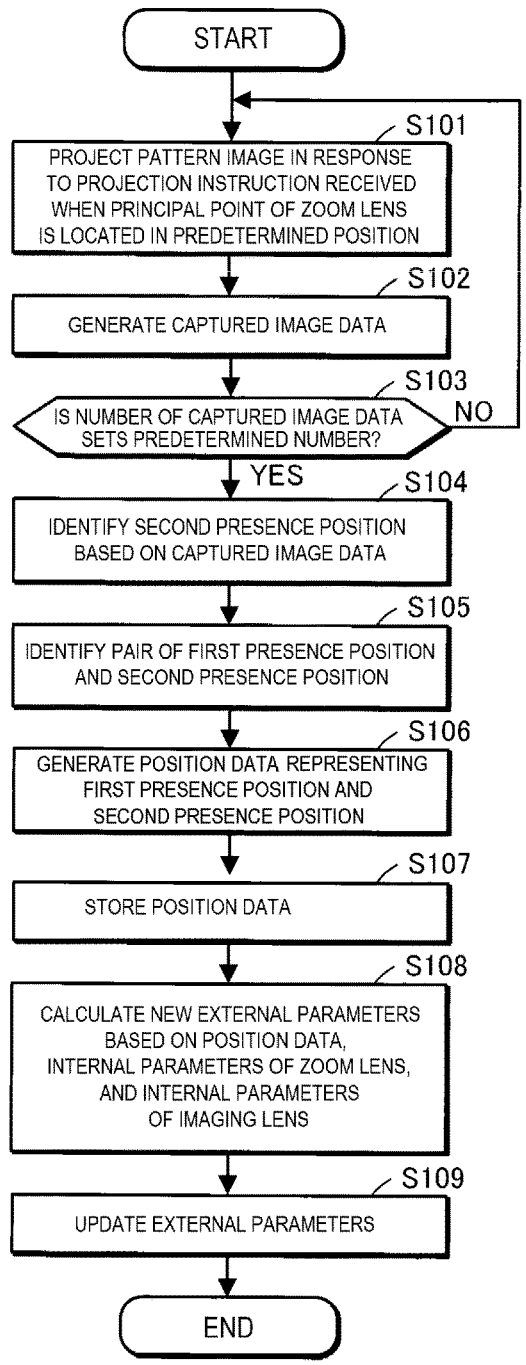
FIG. 10 describes action of updating external parameters.

FIG. 10 describes the action of updating the external parameters stored by the first storage 331. When the user desires to update the external parameters, the user first places the electronic instrument 100 in such a way that a projection image is projected on the object 200 and the camera 2 can capture an image of the projection image on the object 200. The object 200 desirably has an outer surface that provides high optical scatterability, has fixed reflectance, and has irregularities. The object 200 used when the external parameters are updated may differ from an object that is a three-dimensional shape measurement target.

The user subsequently fixes the position of the principal point of the zoom lens 11 to the predetermined position N1, that is, the telescopic end. When the position of the principal point of the zoom lens 11 becomes the predetermined position N1, the lens sensor 4 comes into contact with the detected element 11a and is therefore turned on. When the lens sensor 4 is turned on, the evaluation section 343 determines that the principal point of the zoom lens 11 is located in the predetermined position N1.

The user subsequently inputs a projection instruction of a pattern image to the operation section 31. The operation section 31 provides the processor 34 with the projection instruction. When the processor 34 receives the projection instruction in the situation in which the processor 34 determines that the principal point of the zoom lens 11 is located in the predetermined position N1, the projection control section 341 causes the projection apparatus 1 to project a pattern image PI toward the object 200 in step S101.

Figure 11:
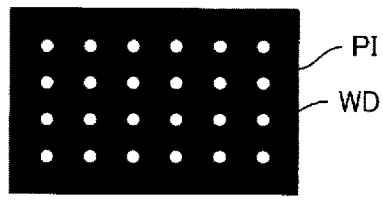
FIG. 11 shows an example of a pattern image.

FIG. 11 shows an example of the pattern image PI. The pattern image PI represents 24 white dots WD arranged in a matrix. The pattern image PI is not limited to the image shown in FIG. 11. For example, the pattern image PI may instead be a gray code pattern.

Subsequently, in step S102, the camera control section 342 causes the image sensor 22 to capture an image of the pattern image PI on the object 200 to cause the image sensor 22 to generate captured image data.

Subsequently, in step S103, the update section 344 evaluates whether or not the number of captured image data sets is a predetermined number. The predetermined number is an integer greater than or equal to "1".

When five or more fourth reference points F1 corresponding in one-to-one correspondence to five or more measurement points G independent of one another can be detected from one captured image data set, the update section 344 can calculate new external parameters from the one captured image data set. The predetermined number may therefore be "1". However, the larger the number of fourth reference points F1, the higher the accuracy of the new external parameters, and the predetermined number may therefore be greater than "1", for example, "2". When the outer surface of the object 200 has a more three-dimensionally complicated shape, the number of fourth reference points F1 can be larger.

When the number of captured image data sets is smaller than the predetermined number, the update section 344 returns to the process in step S101. The user subsequently changes the positional relationship between the electronic instrument 100 and the object 200 to newly create a pair of the third reference point D1 and the fourth reference point F1 each corresponding to the common measurement point G. The user creates the situation in which the projection image is projected on the object 200 and the camera 2 can capture an image of the projection image on the object 200 even in a changed positional relationship. The user subsequently inputs the pattern image projection instruction to the operation section 31. Steps S101 and S102 are then executed.

When the update section 344 determines in step S103 that the number of captured image data sets is the predetermined number, the update section 344 analyzes in step S104 captured images indicated by the captured image data to identify the position of the second presence position F2 corresponding to the first presence position D2, as shown in FIG. 8. The first presence position D2 is, for example, any of the 24 white dots WD shown in FIG. 11. The 24 white dots WD are each an example of a predetermined image.

In step S104, the update section 344 identifies at least five second presence positions F2 corresponding in one-to-one correspondence to at least five first presence positions D2 different from one another. The first presence positions D2 and the second presence positions F2 corresponding to each other correspond to the common measurements point G.

The reason why the update section 344 identifies at least five second presence positions F2 corresponding in one-to-one correspondence to at least five first presence positions D2 different from one another is that the update section 344 can calculate the rotation matrix R1 and the translational matrix T1 as long as at least five measurement points G are provided, as described above.

Subsequently, in step S105, the update section 344 identifies a pair of the first presence position D2 and the second presence position F2 corresponding to each other. The update section 344 identifies at least five such pairs.

Subsequently, in step S106, the update section 344 generates, for each of the pairs of the first presence position D2 and the second presence position F2, position data representing the first presence position D2 and the second presence position F2.

Subsequently, in step S107, the update section 344 stores the position data on a pair basis in the second storage 332.

Subsequently, in step S108, the update section 344 calculates new external parameters based on the position data stored by the second storage 332, the internal parameters of the zoom lens 11 stored by the first storage 331, and the internal parameters of the imaging lens 21 stored by the first storage 331.

In step S108, the update section 344 first reads the position data on a pair basis from the second storage 332. The update section 344 subsequently identifies the first presence position D2 indicated by the position data and the second presence position F2 indicated by the position data. The first presence position D2 and the second presence position F2 are each two-dimensional coordinates. The update section 344 subsequently converts the first presence position D2 into normalized three-dimensional coordinates of the third reference points D1. For example, let (x, y) be the coordinates of the first presence position D2 and (X, Y, Z) be the normalized three-dimensional coordinates of the third reference point D1, and the update section 344 converts the two-dimensional coordinates of the first presence position D2 into the normalized three-dimensional coordinates of the third reference point D1 as follows.

$$X=(x-C_x)/f$$

$$Y=(y-C_y)/f$$

$$Z=1$$

The parameters f, $C_x$, and $C_y$ are values specified based on the internal parameters of the zoom lens 11. The two-dimensional coordinates expressed by (X, Y) are the two-dimensional coordinates of the third reference point D1.

The update section 344 subsequently converts the coordinates of the second presence position F2 into the normalized three-dimensional coordinates of the fourth reference point F1 by using the same approach used to convert the coordinates of the first presence position D2 into the normalized three-dimensional coordinates of the third reference points D1. In this case, the internal parameters of the imaging lens 21 are used in place of the internal parameters of the zoom lens 11.

The update section 344 subsequently newly calculates the rotation matrix R1 and the translational matrix T1 based on the following Expression 4 on the epipolar restriction.

$$p'E1p=0 \quad \text{Expression 4}$$

The parameter p' represents the normalized three-dimensional coordinates of the fourth reference point F1. The parameter p represents the normalized three-dimensional coordinates of the third reference point D1. E1 is a basic matrix. The basic matrix E1 is referred to as an essential matrix. The basic matrix E1 satisfies E1=[T1x]R1.

For example, the update section 344 uses at least five pairs of p and p' to calculate the basic matrix E1 based on Expression 4, for example, by using a nonlinear least squares method. The update section 344 subsequently performs singular value decomposition or any other operation on the calculated basic matrix E1 to decompose the basic matrix E1 into the rotation matrix R1 and the translational matrix T1. The rotation matrix R1 decomposed from the basic matrix E1 and the translational matrix T1 decomposed from the basic matrix E1 form new external parameters.

Upon completion of step S108, the update section 344 replaces in step S109 the external parameters stored by the first storage 331 with the new external parameters to update the external parameters stored by the first storage 331.

After the external parameters are updated, the measurement section 345 uses the updated external parameters to measure the three-dimensional shape of the object 200. The above procedure prevents the measurement section 345 to measure the three-dimensional shape by using the external parameters calculated before the shapes of the members that directly or indirectly support the zoom lens 11 and the imaging lens 21 change with time.

A10: Overview of First Embodiment

The method for controlling the electronic instrument 100 and the electronic instrument 100 according to the present embodiment have the aspects below.

The projection section 13 projects the pattern image PI on the object 200 via the zoom lens 11 after the first storage 331 stores the internal parameters of the zoom lens 11, the internal parameters of the imaging lens 21, and the external parameters. The image sensor 22 captures an image of the pattern image PI on the object 200 via the imaging lens 21 to generate captured image data. The update section 344 does not update the internal parameters of the zoom lens 11 stored by the first storage 331 and the internal parameters of the imaging lens 21 stored by the first storage 331 but updates the external parameters stored by the first storage 331 based on the captured image data, the internal parameters of the zoom lens 11 stored by the first storage 331, and the internal parameters of the imaging lens 21 stored by the first storage 331.

According to the aspect described above, for example, when the shapes of the members that directly or indirectly support the zoom lens 11 and the imaging lens 21 change with time, the external parameters affected by the change with time can be updated. The electronic instrument 100 can therefore suppress the situation in which a low-reliability external parameter keeps existing. The electronic instrument 100 can further suppress unnecessary update of the internal parameters of the zoom lens 11 and the internal parameters of the imaging lens 21. The zoom lens 11 is an example of the projection lens. The projection lens is not limited to the zoom lens 11 and may, for example, be a fixed-focal-point lens.

Part of the pattern image PI represents the dots WD. The captured image data represents a captured image representing the dots WD on the object 200. The update section 344 identifies the positions of the dots WD in the captured image based on the captured image data. The update section 344 does not update the internal parameters of the zoom lens 11 stored by the first storage 331 and the internal parameters of the imaging lens 21 stored by the first storage 331 but updates the external parameters stored by the first storage 331 based on the positions of the dots WD in the captured image, the internal parameters of the zoom lens 11 stored by the first storage 331, and the internal parameters of the imaging lens 21 stored by the first storage 331.

According to the aspect described above, the external parameters can be updated by using the dots WD indicated by the pattern image PI. The dots WD are an example of the predetermined image. The shape of the predetermined image is not limited to the dots WD, may, for example, be a polygon, and can be changed as appropriate.

The internal parameters of the zoom lens 11 represent the characteristics of the zoom lens 11 when the principal point of the zoom lens 11 is located in the predetermined position N1. The external parameters represent the arrangement of the zoom lens 11 and the imaging lens 21 when the principal point of the zoom lens 11 is located in the predetermined position N1. The projection section 13 projects the pattern image PI on the object 200 via the zoom lens 11 in the situation in which the principal point of the zoom lens 11 is located in the predetermined position N1. According to the aspect described above, the electronic instrument 100 can update the external parameters by using the internal parameters of the zoom lens 11 when the principal point of the zoom lens 11 is located in the predetermined position N1.

The focal length of the zoom lens 11 can be changed over the range from the first focal length f1 to a second focal length f2. The predetermined position N1 is any of the position of the principal point of the zoom lens 11 when the focal length of the zoom lens 11 is the first focal length f1, the position of the principal point of the zoom lens 11 when the focal length of the zoom lens 11 is the second focal length f2, and the position of the principal point of the zoom lens 11 when the focal length of the zoom lens 11 differs from both the first focal length f1 and the second focal length f2. According to the aspect described above, the predetermined position N1 can be set in accordance, for example, with what is called the "telescopic end" or the "wide angle end".

The second storage 332 stores the position data representing the positions of the dots WD in the capture image. The update section 344 does not update the internal parameters of the zoom lens 11 stored by the first storage 331 and the internal parameters of the imaging lens 21 stored by the first storage 331 but updates the external parameters stored by the first storage 331 based on the position data stored by the second storage 332, the internal parameters of the zoom lens 11 stored by the first storage 331, and the internal parameters of the imaging lens 21 stored by the first storage 331.

According to the aspect described above, the second storage 332 can accumulate the position data necessary for the update of the external parameters. The update section 344 can update the external parameters by using the position data having been stored in the second storage 332 and can therefore update the external parameters irrespective of the timing of the generation of the captured image data. When the second storage 332 stores a plurality of position data sets, the update section 344 can update the external parameters by using the plurality of position data sets. The update section 344 can therefore create accurate updated external parameters.

B: Variations

Aspects of variations of the embodiment presented above by way of example will be presented below by way of example. Two or more aspects arbitrarily selected from those presented below by way of example may be combined with each other as appropriate to the extent that the aspects to be combined with each other do not contradict each other.

B1: First Variation

In the first embodiment, the evaluation section 343 evaluates whether or not the principal point of the zoom lens 11 is located in the predetermined position N1. When the evaluation section 343 determines that the principal point of the zoom lens 11 is located in the predetermined position N1, the projection section 13 may project the pattern image PI on the object 200 via the zoom lens 11.

According to the aspect described above, the electronic instrument 100 can automatically generate captured image data necessary for the update of the external parameters even when no special instruction, such as the projection instruction, is issued from the user. Further, the electronic instrument 100 can project the pattern image PI, capture an image of the pattern image PI on the object 200, and identify the positions of the dots WD in the captured image when the principal point of the zoom lens 11 is located in the predetermined position N1 irrespective of whether or not three-dimensional shape measurement is performed. In this case, the update section 344 may automatically update the external parameters based on the newly identified positions of the dots WD even when no special instruction is issued from the user.

B2: Second Variation

In the first embodiment and the first variation, the operation section 31 may receive an update instruction of update of the external parameters from the user. In this case, the operation section 31 provides the update section 344 with the update instruction. Upon reception of the update instruction, the update section 344 does not update the internal parameters of the zoom lens 11 stored by the first storage 331 and the internal parameters of the imaging lens 21 stored by the first storage 331 but updates the external parameters stored by the first storage 331 based on the position data stored by the second storage 332, the internal parameters of the zoom lens 11 stored by the first storage 331, and the internal parameters of the imaging lens 21 stored by the first storage 331. According to the aspect described above, the electronic instrument 100 can update the external parameters at a timing desired by the user.

B3: Third Variation

In the first embodiment and the first and second variations, when 30 days elapses after the position data is stored in the second storage 332, the update section 344 may delete the position data from the second storage 332. According to the aspect described above, the electronic instrument 100 can suppress update of the external parameters using low reliability position data. The 30 days are an example of a predetermined period. The predetermined period is not limited to 30 days and may be shorter or longer than 30 days.

B4: Fourth Variation

In the first embodiment and the first to third variations, when the number of external parameter update operations performed after the position data is stored in the second storage 332 exceeds a predetermined number, the update section 344 may delete the position data from the second storage 332. According to the aspect described above, the electronic instrument 100 can suppress update of the external parameters using low reliability position data. The predetermined number is, for example, five. The predetermined number may be smaller or greater than five.

B5: Fifth Variation

When a specific period elapses after the position data is stored in the second storage 332, the update section 344 may cause the display section 32 to display a message that prompts the user to update the external parameters. The message that prompts the user to update the external parameters is, for example, "Update external parameters." The message that prompts the user to update the external parameters is not limited to the message described above and can be changed as appropriate. The specific period is, for example, 30 days. The specific period is not limited to 30 days and may be shorter or longer than 30 days.

B6: Sixth Variation

The first embodiment and the first to fifth variations are applicable to general three-dimensional shape measurement tools used in robotics. The first embodiment and the first to fifth variations are also applicable to a projector that measures the three-dimensional shape of a projection surface and geometrically corrects a projection image in accordance with the result of three-dimensional shape measurement.

B7: Seventh Variation

In the first embodiment and the first to sixth variations, the liquid crystal light valve 132 is used as an example of the light modulator, and the light modulator is not limited to a liquid crystal light valve and can be changed as appropriate. For example, the light modulator may be based, for example, on one digital mirror device. In place of a liquid crystal panel or a DMD, a configuration capable of modulating the light outputted from the light source 131 is employable as the light modulator.

What is claimed is:

1. A method for controlling an electronic instrument including a projection section that projects an image via a projection lens and an imaging sensor that performs imaging via an imaging lens, the method comprising:

causing a first storage to store first characteristic data representing characteristics of the projection lens, second characteristic data representing characteristics of the imaging lens, and arrangement data representing arrangement of the projection lens and the imaging lens and then causing the projection section to project a pattern image on an object via the projection lens;

causing the imaging sensor to capture an image of the pattern image on the object via the imaging lens to generate captured image data; and updating the arrangement data stored by the first storage based on the captured image data, the first characteristic data stored by the first storage, and the second characteristic data stored by the first storage without updating the first characteristic data stored by the first storage and the second characteristic data stored by the first storage, wherein:

part of the pattern image represents a predetermined image, the captured image data represents a captured image representing the predetermined image on the object, a position of the predetermined image in the captured image is identified based on the captured image data, a second storage stores position data representing the position of the predetermined image in the capture image, and the first characteristic data stored by the first storage and the second characteristic data stored by the first storage is not updated, but the arrangement data stored by the first storage is updated based on the position data stored by the second storage, the first characteristic data stored by the first storage, and the second characteristic data stored by the first storage.

2. The control method according to claim 1, wherein the projection lens is a zoom lens, the first characteristic data represents characteristics of the zoom lens when a principal point of the zoom lens is located in a predetermined position, the arrangement data represents the arrangement of the zoom lens and the imaging lens when the principal point of the zoom lens is located in the predetermined position, and the projection section projects the pattern image on the object via the zoom lens in a situation in which the principal point of the zoom lens is located in the predetermined position.

3. The control method according to claim 2, wherein a focal length of the zoom lens is changeable over a range from a first focal length to a second focal length, and the predetermined position is any of the position of the principal point of the zoom lens when the focal length is the first focal length, the position of the principal point of the zoom lens when the focal length is the second focal length, and the position of the principal point of the zoom lens when the focal length differs from both the first focal length and the second focal length.

4. The control method according to claim 2, wherein it is evaluated whether or not the principal point of the zoom lens is located in the predetermined position, and the projection section projects the pattern image on the object via the zoom lens when it is determined that the principal point of the zoom lens is located in the predetermined position.

5. The control method according to claim 1, wherein the first characteristic data stored by the first storage and the second characteristic data stored by the first storage is not updated when an update instruction of update of the arrangement data is received, but the arrangement data stored by the first storage is updated based on the position data stored by the second storage, the first characteristic data stored by the first storage, and the second characteristic data stored by the first storage.

6. The control method according to claim 1, wherein when a predetermined period elapses after the position data is stored in the second storage, the position data is deleted from the second storage.

7. The control method according to claim 1, wherein when the number of actions of the update operation performed after the position data is stored in the second storage exceeds a predetermined number, the position data is deleted from the second storage.

8. An electronic instrument comprising:

a projection section that projects a pattern image on an object via a projection lens after a first storage stores first characteristic data representing characteristics of the projection lens, second characteristic data representing characteristics of an imaging lens, and arrangement data representing arrangement of the projection lens and the imaging lens;

an imaging sensor that captures an image of the pattern image on the object via the imaging lens to generate captured image data; and one or more processors that do not update the first characteristic data stored by the first storage and the second characteristic data stored by the first storage but update the arrangement data stored by the first storage based on the captured image data, the first characteristic data stored by the first storage, and the second characteristic data stored by the first storage, wherein:

part of the pattern image represents a predetermined image, the captured image data represents a captured image representing the predetermined image on the object, a position of the predetermined image in the captured image is identified based on the captured image data, a second storage stores position data representing the position of the predetermined image in the capture image, and the first characteristic data stored by the first storage and the second characteristic data stored by the first storage is not updated, but the arrangement data stored by the first storage is updated based on the position data stored by the second storage, the first characteristic data stored by the first storage, and the second characteristic data stored by the first storage.

* * * * *